US011864095B2

(12) United States Patent
Bouchet et al.

(10) Patent No.: US 11,864,095 B2
(45) Date of Patent: Jan. 2, 2024

(54) MULTIPLE ACCESS POINTS FOR DATA CONTAINERS

(71) Applicant: Amazon Technologies, Inc., Seattle, WA (US)

(72) Inventors: Malik Bouchet, Seattle, WA (US); Chandan Talukdar, Seattle, WA (US); Christopher A. Stephens, Fall City, WA (US); Anna Viktorivna Druzkina, Seattle, WA (US); Richard M. Sears, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/046,866

(22) Filed: Oct. 14, 2022

(65) Prior Publication Data

US 2023/0061347 A1    Mar. 2, 2023

Related U.S. Application Data

(63) Continuation of application No. 16/917,507, filed on Jun. 30, 2020, now Pat. No. 11,477,725.

(51) Int. Cl.
*H04W 48/16* (2009.01)
*H04W 12/08* (2021.01)
(Continued)

(52) U.S. Cl.
CPC ........... *H04W 48/16* (2013.01); *H04L 67/133* (2022.05); *H04W 12/08* (2013.01); *H04W 48/18* (2013.01); *H04W 88/08* (2013.01); *H04W 92/20* (2013.01)

(58) Field of Classification Search
CPC ..... H04W 48/16; H04W 92/20; H04W 88/08; H04W 48/18; H04W 12/08; H04L 67/40
(Continued)

(56) References Cited

U.S. PATENT DOCUMENTS

| 6,122,754 A | 9/2000 | Litwin et al. |
| 7,944,914 B2 | 5/2011 | Hurtta |

(Continued)

FOREIGN PATENT DOCUMENTS

| CA | 2318102 | 8/1999 |
| EP | 2793434 | 10/2014 |

OTHER PUBLICATIONS

International Search Report and Written Opinion dated Sep. 28, 2021 in Application No. PCT/US2021/039585, Amazon Technologies, Inc., pp. 1-10.

*Primary Examiner* — Inder P Mehra
(74) *Attorney, Agent, or Firm* — Robert C. Kowert; Kowert, Hood, Munyon, Rankin & Goetzel, P.C.

(57) ABSTRACT

Disclosed are system architectures and techniques for multiple access points for a data container. Control plane and data plane APIs are disclosed for generating access points and associating the access points with data containers, as well as for generating access point policies that specify permissions for the access points. More than one access point may be associated with a single data container. A storage service receives requests directed to the access points, and grants or denies the requests based on the permissions specified in the corresponding policies. Various types of use cases for using access policies are contemplated such as default, regional, or network-based (e.g., VPC-based) use-cases or the like. A system may implement layers of policies such as identity and access management policies, access point policies and data container policies.

20 Claims, 9 Drawing Sheets

(51) Int. Cl.
  *H04W 48/18*    (2009.01)
  *H04W 88/08*    (2009.01)
  *H04W 92/20*    (2009.01)
  *H04L 67/133*    (2022.01)
  *G06F 16/25*    (2019.01)

(58) Field of Classification Search
  USPC .......................................................... 370/338
  See application file for complete search history.

(56)       References Cited

U.S. PATENT DOCUMENTS

| | | |
|---|---|---|
| 8,504,758 B1 | 8/2013 | McHugh et al. |
| 10,013,705 B2 | 7/2018 | Mikurak |
| 11,106,477 B2 | 8/2021 | Miller et al. |
| 11,477,725 B2 | 10/2022 | Bouchet et al. |
| 2004/0107342 A1 | 6/2004 | Pham et al. |
| 2005/0287880 A1 | 12/2005 | Okuyama |
| 2012/0254825 A1 | 10/2012 | Sharma et al. |
| 2018/0310243 A1 | 10/2018 | Yoshino et al. |
| 2020/0320061 A1* | 10/2020 | Korpman ................. G06F 9/54 |
| 2021/0037060 A1 | 2/2021 | Robison et al. |

\* cited by examiner

MULTIPLE ACCESS POINTS FOR DATA CONTAINERS

This application is a continuation of U.S. patent application Ser. No. 16/917,507, filed Jun. 30, 2020, which is hereby incorporated by reference herein in its entirety.

BACKGROUND

Various storage systems store and/or group data and/or objects in various types of data containers (e.g., buckets, blobs, etc.). Example types of storage systems include object stores, key-value stores, etc. In an example system, stored objects may include the data itself, a variable amount of metadata, and a globally unique identifier.

Storage can be implemented at multiple levels, including the device level (object-storage device), the system level, and the interface level. In an example storage system, interfaces can be directly programmable by the application, namespaces may span multiple instances of physical hardware, and data-management functions like data replication and data distribution may function at object-level granularity.

Some data container storage systems allow retention of massive amounts of unstructured data. Data container storage is used for purposes such as storing photos on social media, songs on music services, or files in online collaboration services, as a non-exhaustive set of examples.

Some data containers are accessed via a single identifier that is associated with access controls. The single identifier limits flexibility in the granularity at which access can be customized for a data container. For example, a data container-level policy (a policy associated with a particular data container) specifies a single set of access rules applicable to all accesses of the data container.

Figure 1:
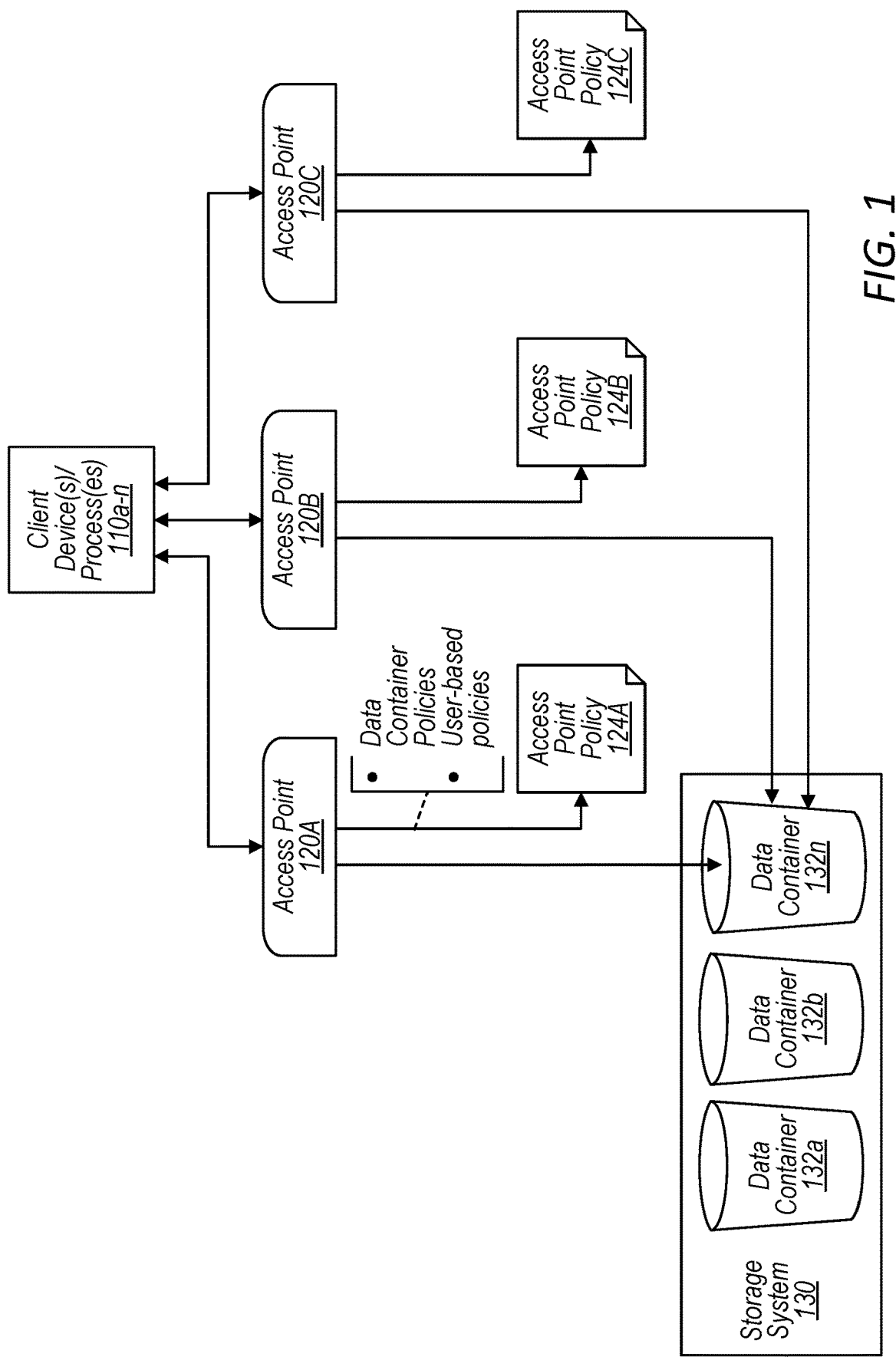
FIG. 1 illustrates a block diagram of an architecture for implementing multiple access points for data containers, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, various embodiments of systems and methods for implementing multiple access points for a data storage container are disclosed. In prior systems, access to data containers has been limited to a single point of access (e.g., controlled via access controls). Described herein, in at least some embodiments, is an architecture that implements more than one access point for a data container. Various types of access points (e.g., access points with varying configurations—such as varying metadata) to access a data container are contemplated, such as default access points, as well as use cases for using access points such as a regional use case, virtual provide cloud (VPC) use case and a custom use case (e.g., customizable access points). In some embodiments, an access point policy that specifies permissions can be associated with an access point. Access points may be implemented a number of different ways such as via various identifiers, names (e.g., a domain name), or the like, etc.

With an architecture that supports multiple access points for a single data container, behaviors or functionality that were once specified across the entire data container (e.g., container-level policies specifying access via a single point) can be specified with varying granularity (e.g., different types of access points specify varying types of access to the same container), in embodiments. Instead of a single container level policy, various different grants and restrictions and rules, etc., for a data container can be subdivided across multiple different policies, each associated with a different access point for that same data container, that match restrictions and privileges, etc. with users of the data at varying levels of granularity, in embodiments.

In embodiments, permission holders (e.g., owners with privileges, account holders, or a user or entity given authority to perform functionality such as establishing data container access points, etc.) may request creation of containers as well as request creation of one or more access points to be associated with each of the containers. For example, a system that implements multiple access points for data containers may implement a multiple access point manager that provides an interface (e.g., API, GUI, command line, etc.) for an entity with authority to make access point creation requests. Other types of requests may be made via the interface, in embodiments, such as access point modification requests, or access point deletion requests, as non-exhaustive examples.

The multiple access point manager may be configured to perform the requested actions and store related data to a data store (e.g., a multiple access point data store). In an example embodiment, creation of an access point may include the manager generating one or more of access point data (e.g., an address of the access point, etc.), generating access point metadata, and generating an access point policy (e.g., a default policy or otherwise) and sending the data to a data store to be stored.

Each of various entities and/or processes may be granted particularized, use-case-based access to a same, common data container of data via respective access point policies associate with respective access points, in embodiments. The access point policies may be generated based an access point policy templates, may be customizable (custom tailored for a particular access use-case), may be re-used or the like (e.g., reusable policy snippets used to specify grants and restrictions, rules and the like, may be defaults or customizable), in embodiments.

Policies

In some embodiments, a system architecture may include layers of policies. Each policy layer may include type of policy with common characteristics, such as defining permission tailored for the particular policy layer. For example, multiple types of policies are contemplated and may be integrated into a system that implements multiple access points for data container storage, such as, but not limited to: identity-based policies, resource-based policies, permissions boundaries, an organization's service control policies, access control lists, and session policies. One or more policies of varying policy type may be applied to a request, in various different system configurations. For example, some systems may apply identify-based policies (one layer) as well as data container access point policies (another layer) to requests to determine whether to grant the requests. In embodiments, a layer populates some criterion that is used to make a decision.

In some systems, various policy layers may be described as higher in the hierarchy than other policy layers. For example, in some systems, identity-based policies may be higher up in the policy layer hierarchy than data container access-point policies.

In embodiments, a policy, when associated with an identity or a resource such as a data container, defines permissions for that identity or resource. Data container access point policies may be requested for creation by authorized entities (e.g., owner, process, privileged user or role, etc.) and a system that implements multiple access points for data container storage can respond to the requests by generating the access point policies and storing the policies. For example, policies may be stored as JSON documents, in embodiments. Associations between the policies and the data containers may be requested for generation and then stored as well. A system that implements multiple access points for data container storage may evaluate the access point policy when an authorized entity (e.g., process, user or role, etc.) makes a request directed to the access point. Permissions in the access point policies determine whether the request is granted or denied, in embodiments.

In embodiments, access point policies may specify (in combination with defining permissions for the entities or users that are authorized or not, in embodiments) permissions regarding the type of access that is allowed. For example, policy permissions may limit access to a particular type of access (e.g., read-only access, or access only from a VPC (virtual private cloud), etc.) or may specify application of a particular filter or function to the data in the data container (e.g., filtered access).

Other, non-exhaustive, example permissions that may be specified in the policy may limit access to a particular type of functionality such as being limited to calling an arbitrary transformation on data in the data container, or encrypting the data in the data container.

In embodiments, a policy may specify permissions for various functional or logical processing associated with data in the data container, or data being stored into the container, such as application of artificial intelligence, redaction processing (of data already in a data container, or of data being stored to the data container), logic to be run against the request, etc.

In embodiments, access point policies for respective access points of a same data container provide for specification of different access privileges to the data in the data container. Implementation of such policies can be used to control an entities (e.g., a user or client or process, etc.) access to data in a data container based on the particular access point being used for the access. In some examples, a benefit of such a technical implementation is that various different types of access can be provided, via the various access points, without the clients or users having any idea that there are other access points that point to the same data container. For example, consider multiple access points A, B, and C that point to data container 1. Access point A can provide general access to all of the data in data container 1 (as specified in a corresponding access point policy), while an access point policy for access point B may specify a filtered view of the data in data container 1 (e.g. filtered access to only those fields/records to which those users are privileged). Such an implementation provides users that access data container 1 through access point A with general access to all of the data, while limiting access for the users that access data container 1 through access point B to only the fields/records to which they are privileged. To further the example, access point C has a function (e.g., a serverless function) (and possibly also a filter, in embodiments) that is seamlessly applied to any data retrieved through this access point. The function may obfuscate or encrypt data from the data container 1, track the number of requests, and/or throttles requests through access point C, and/or summarize data from the access point without enabling the end user to actually access the data itself.

In some embodiments, a policy process component (not illustrated) may perform the processing or may instruct some other component(s) to perform the processing.

Access point policies may operate at a different granularity than other types of policies. In some embodiments, access point policies are not user-specific. In some embodiments, access point policies are not object-specific. Access point policies may be access-point-specific in embodiments. In embodiments, access point policies specify an access-point-specific path for accessing something, such as a data container, but may control access to other computer-based features as well.

In some embodiments (e.g., systems with multiple layers of policies), access point policies are policies, in addition to other policies that have been determined independently of an access point. For instance, in a system that implements user identity-based policies and access point policies, the access point policies (policies determined dependent on an access point) are in addition to the identity-based policies (policies determined independently of an access point because they are determined based on identity, instead of based on the access point).

In embodiments, various settings (default of otherwise) may be specified in access point policies, such as requiring tagging of the data in the data container with particular tags, adding object prefix overrides, assignment of a default storage class, etc. Defaults in policies may be overridden with other settings, in embodiments. Policies are contemplated that include requirements (default or otherwise) that cannot be overridden, in embodiments.

An architecture that supports multiple access points for a data container provides additional flexibility in the way that various different policies can be matched with the different access points to provide varying levels or layers of access restrictions and privileges, in embodiments.

A service that makes use of policies (e.g., a storage or compute service) may populate information needed to make decisions from information stored in the policies. For example, a storage system may collect data from various policies to make decisions, such as whether to grant a request.

Use Cases

Various use cases are contemplated and are illustrative, instead of comprehensive. For example, a "block public access" setting (e.g., block access by non-specific grants) specified in an access point policy for one access point may have different characteristics than a "block public access" setting in a policy for a different access point based on the particular specification in the policy associated with the particular access point. Block public access may be turned off for one access point but not for another access point, for the same data container, for example.

In another example, defaults or the like may be set based on the particular call path (a call path including the access point and/or the point from where the request was transmitted). For example, different access policies may specify different types of encryption for all objects created through that access point (server side with a particular user key, or server-side encryption with client-provided key, etc.). A finance department may require their data be encrypted with a particular key of that department (implemented via a finance-department-specific access point with a policy that specifies that encryption), while the legal department that uses the same data container for storage accesses that container via a different access point that specifies encryption with a key particular to the legal department. Various different data within a data container may or may not be encrypted or may be encrypted differently, in embodiments.

Such examples illustrate that an architecture that supports multiple access points for a single data container, behaviors or functionality that were once specified across the entire data container (e.g., container-level policies) can be subdivided into multiple different policies that match restrictions and privileges with users of the data at varying levels of granularity.

In embodiments, characteristics that were once specified at the data container level, can be specified at the access point policy level (e.g., as API parameters or the like).

For example, in some use cases, a data container that is used for different reasons by different entities may be associated with different access points, each access point associated with a respective access point policy that grants privileges or specifies restrictions tailored to the particular entities particular use. A data container used by a software development team may be associated with an access point that is associated with a policy that restricts access to the software development team and grants both read and write privileges while that same data container may also be associated with an access point that is associated with a policy that provides public or regional access, limited to read-only access, for example.

In another use case, a system architected to support multiple access points for a single data container provides an ability to give a data container various different names. For example, a data container for an engineering project may be associated with an access point given an engineering name (e.g., prototype version 3A") while another access point associated with that same container may be given a different name for the marketing team (e.g., "Data Analyzer 500").

In another use case, a system architected to support multiple access points for a single data container provides an ability to restrict access to requests from a particular network, such as a virtual private cloud, or virtual private network or the like. For instance, a policy associated with an access point may restrict access to only a particular network, such as a virtual private cloud, or virtual private network or the like. Enforcement may be via API parameters or arguments that are enforced at the time of creation of the access point (enforced at the control layer, for example), in embodiments. In an example, a control plane requirement may require that all access points be concealed (for a particular data container).

In another use case, a system architected to support multiple access points for a single data container provides an ability to migrate in a way that minimizes exposure to errors or unwanted behavior. For example, clients using an existing access point associated with an access point policy having a particular set of characteristics (e.g., restrictions, privileges, etc.) may gradually be migrated to a newer access point associated with a different access point policy, both access points associated with the same container, in embodiments. Similarly, clients using an access point exhibiting one behavior may be transitioned to a newer or different access point that exhibits a different behavior, gradually.

One Access Point—Multiple Data Containers

In some embodiments, multiple data containers may be associated with a same access point. For an example directed to geolocation routing, a single access point may be used to provide access to data containers in multiple different geographic regions. In a particular example, a customer account may be associated with a single access point, but accesses, via the access point by a user in an eastern region may be directed to a container in the eastern region while accesses, via the same access point by another use in a western region may be directed to a container in the western region. In embodiments, the regional data containers may be in various states of synchronization: unsynchronized, partially synchronized or synchronous, for an example. In some embodiments, the regional data containers are associated with an access point that is associated with policies that specify bidirectional replication (e.g., a level of desired replication across regions and/or level of synchronization across the data containers in different regions).

One Access Point, Multiple Containers

In some embodiments (in combination with other embodiments, or not), one access point may be associated with multiple containers (not illustrated). In another regional example, clients in different regions may all use the same access point to make requests, but the system may be configured to route the requests to a local version or local copies of the data from the data container. For instance, requests from region A and region B may be addressed to the same access point, but once the system receives the requests, the system may route the request from region A to a copy of the target data container in region A and may route the request from region B to a copy of the target data container in region B. Such an example illustrates the flexible nature of access points that are decoupled from the data containers they can be associated with.

Figure 2:
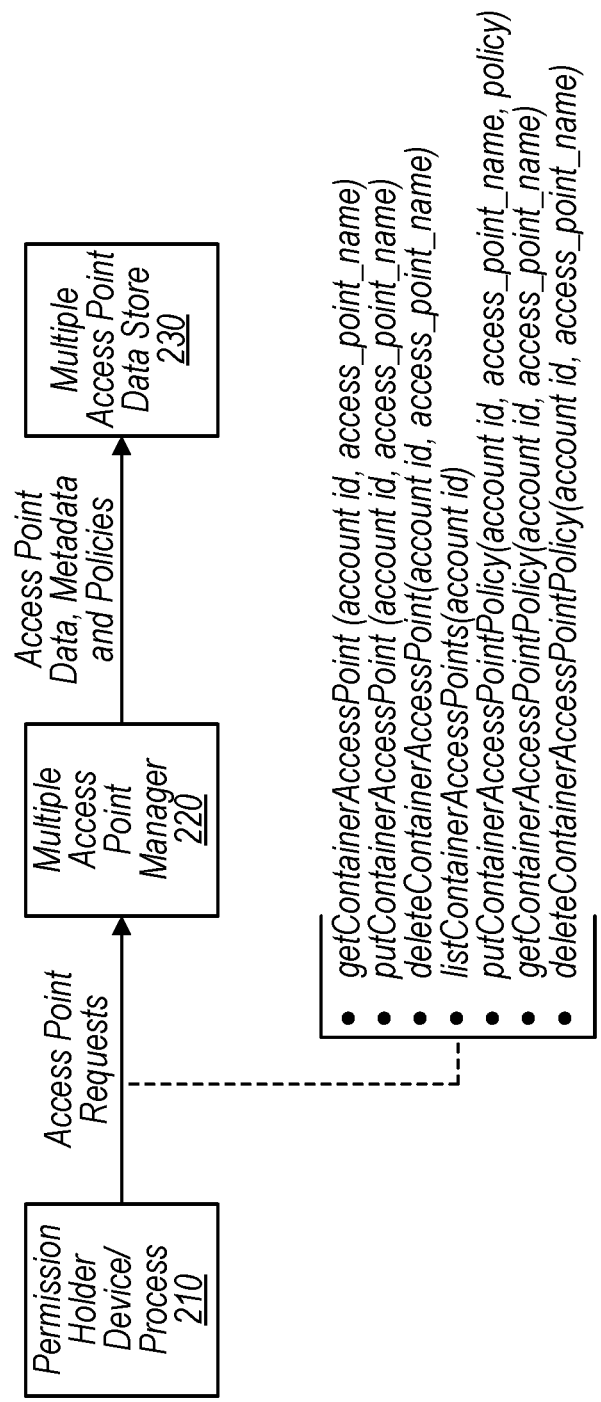
FIG. 2 illustrates a block diagram of a multiple access point manager, and API for a system that implements multiple access points for data containers, according to some embodiments.
Figure 3:
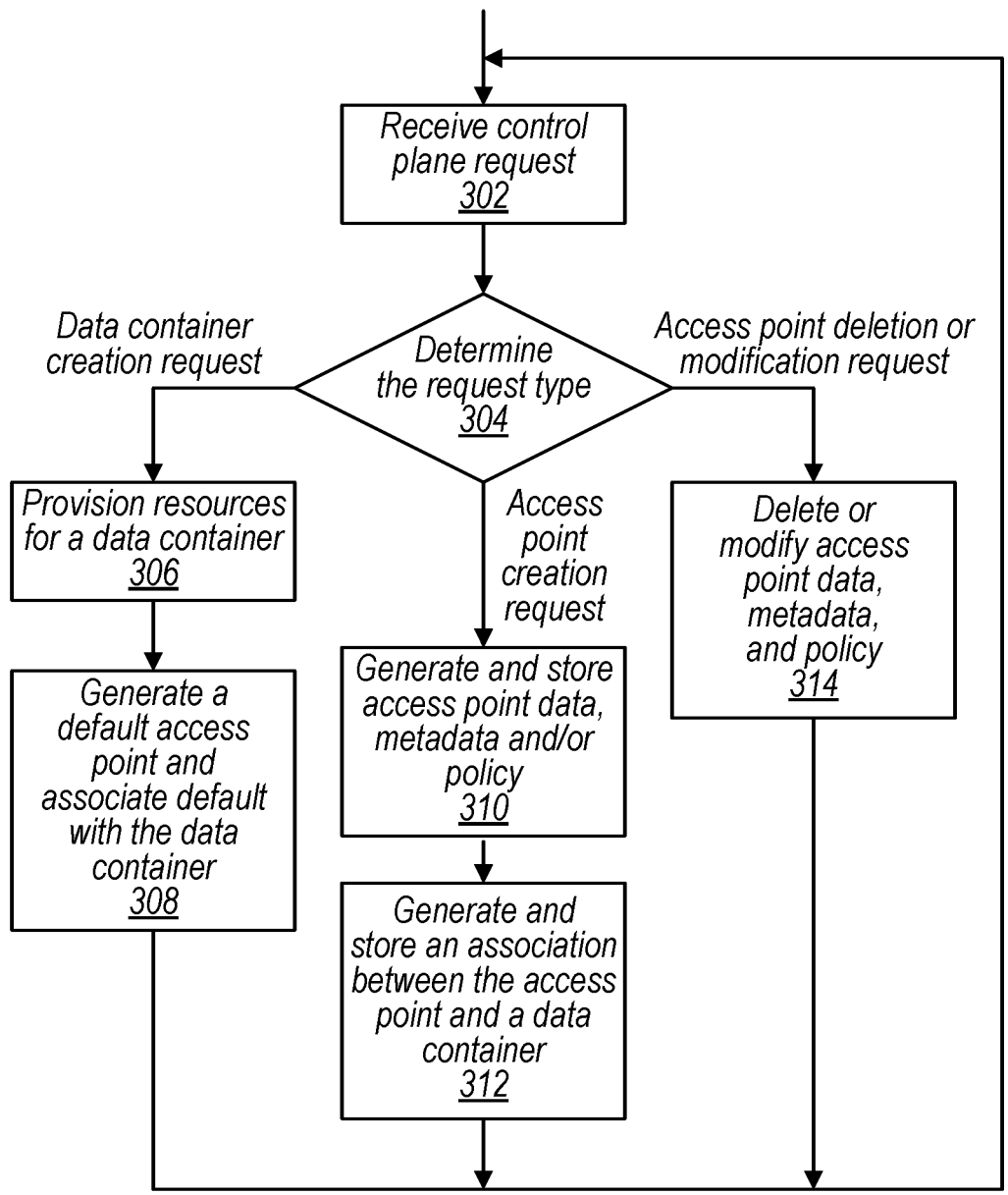
FIG. 3 illustrates a flowchart for control plane requests in a system that implements multiple access points for data containers, according to some embodiments.
Figure 4:
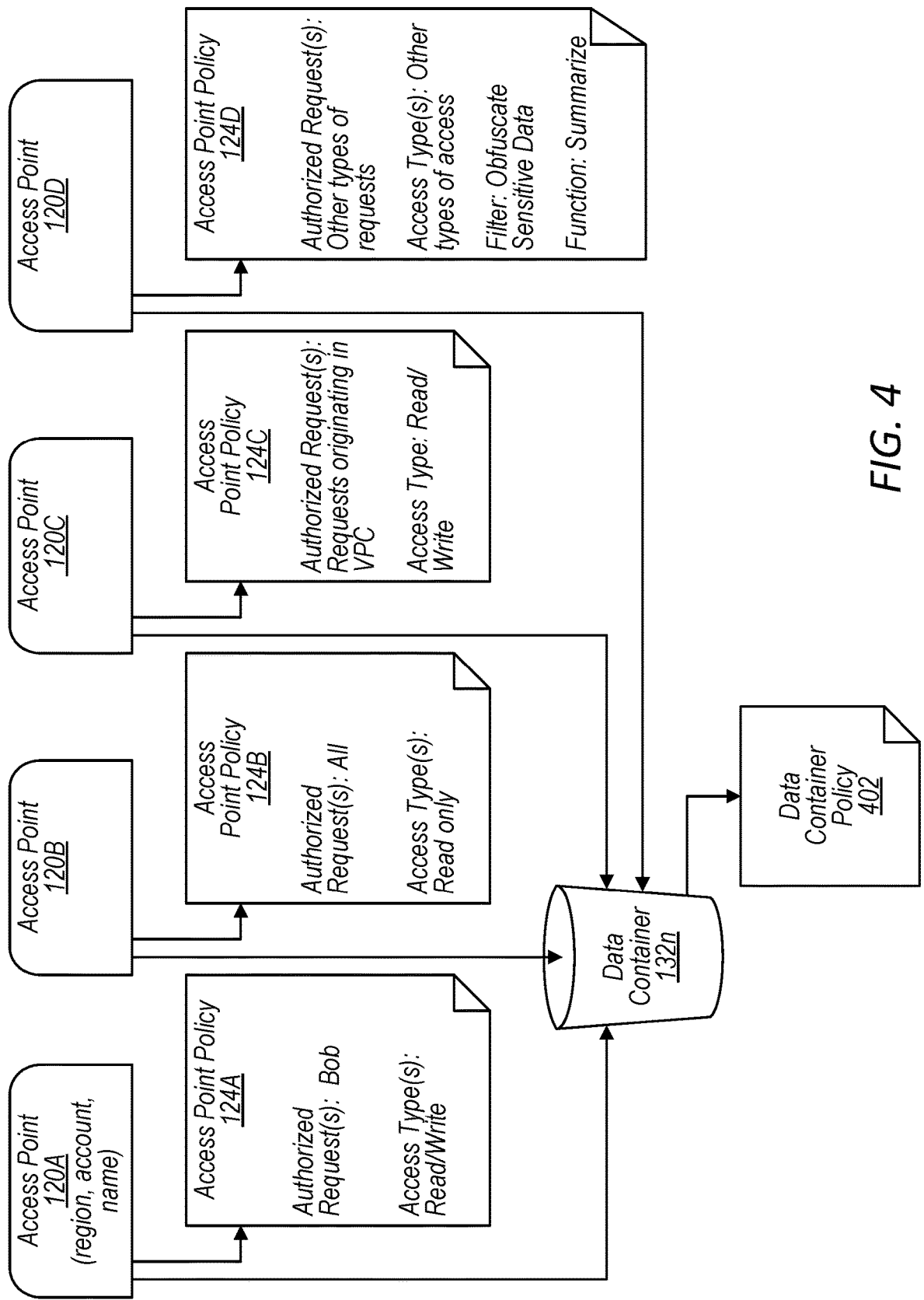
FIG. 4 illustrates various types of access point policies, according to some embodiments.
Figure 5:
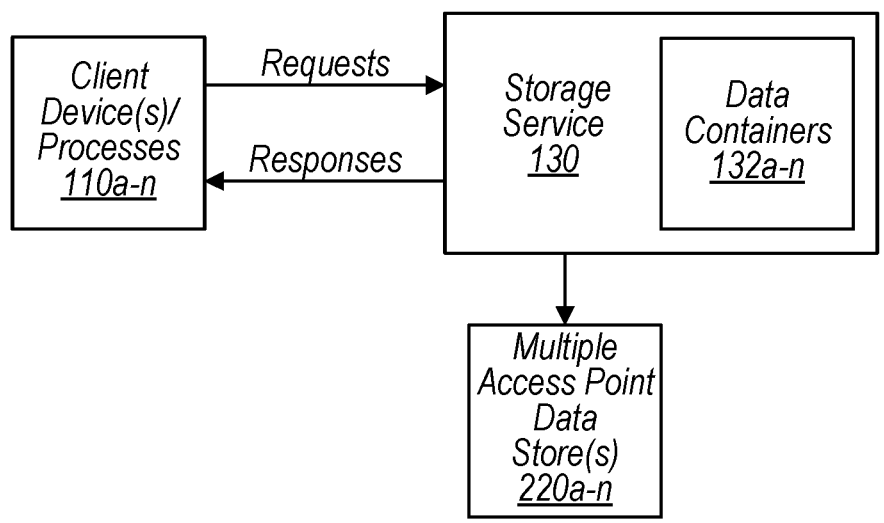
FIG. 5 illustrates a block diagram of components the generate and process data plane requests in a system that implements multiple access points for data containers, according to some embodiments.
Figure 6:
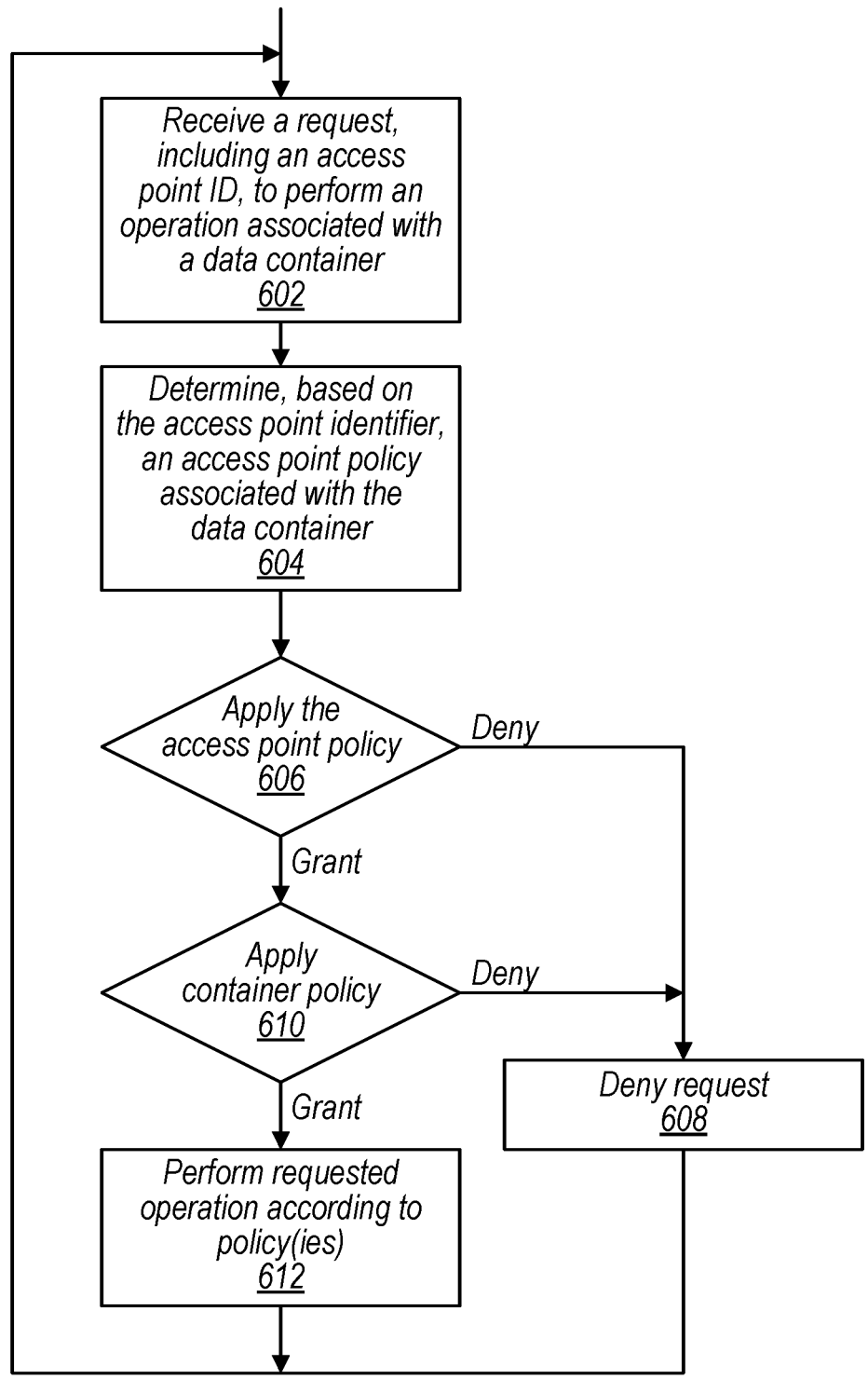
FIG. 6 illustrates a flowchart for processing data plane requests in a system that implements multiple access points for data containers, according to some embodiments.
Figure 7:
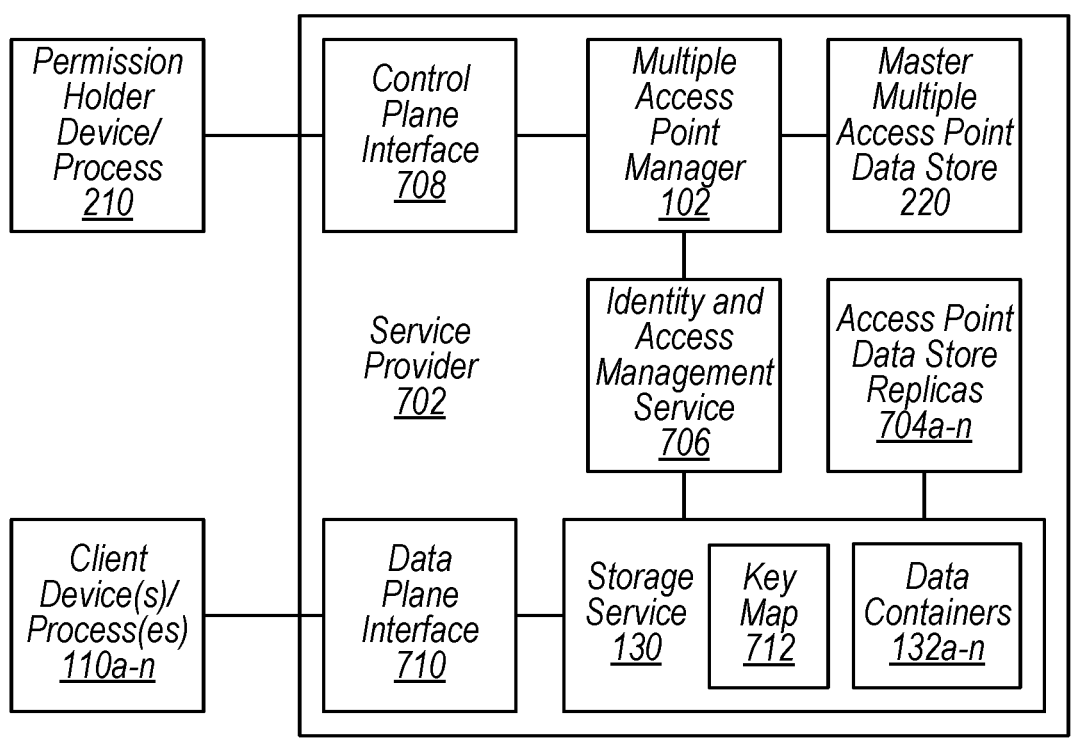
FIG. 7 illustrates a service provider network that provides control plane and data plane interfaces for a system that implements multiple access points for data containers, according to embodiments.
Figure 8:
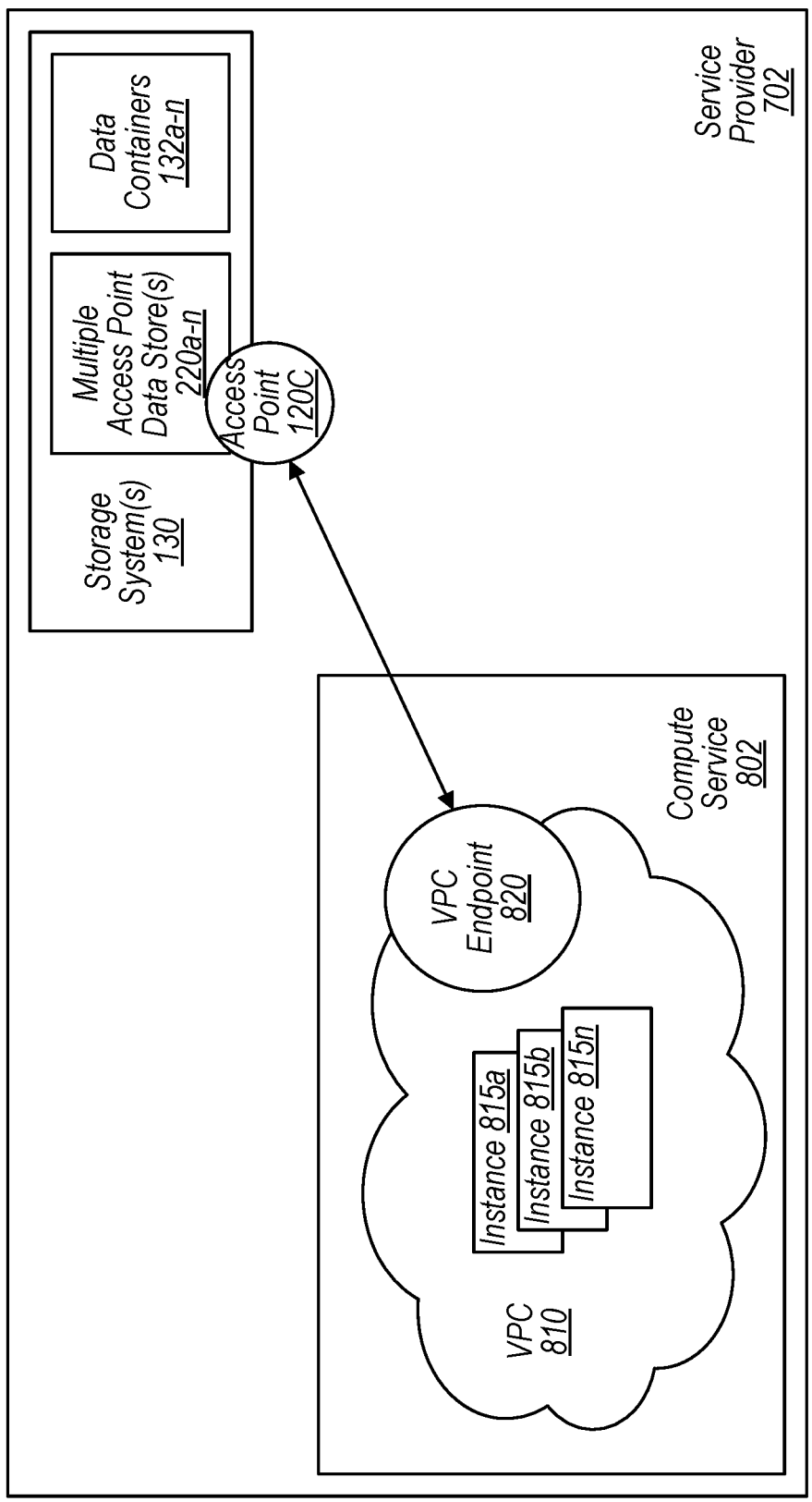
FIG. 8 illustrates a logical block diagram of a service provider with a compute instance system that implements a virtual private cloud, as well as a storage system that implements multiple access points for data containers, according to some embodiments.
Figure 9:
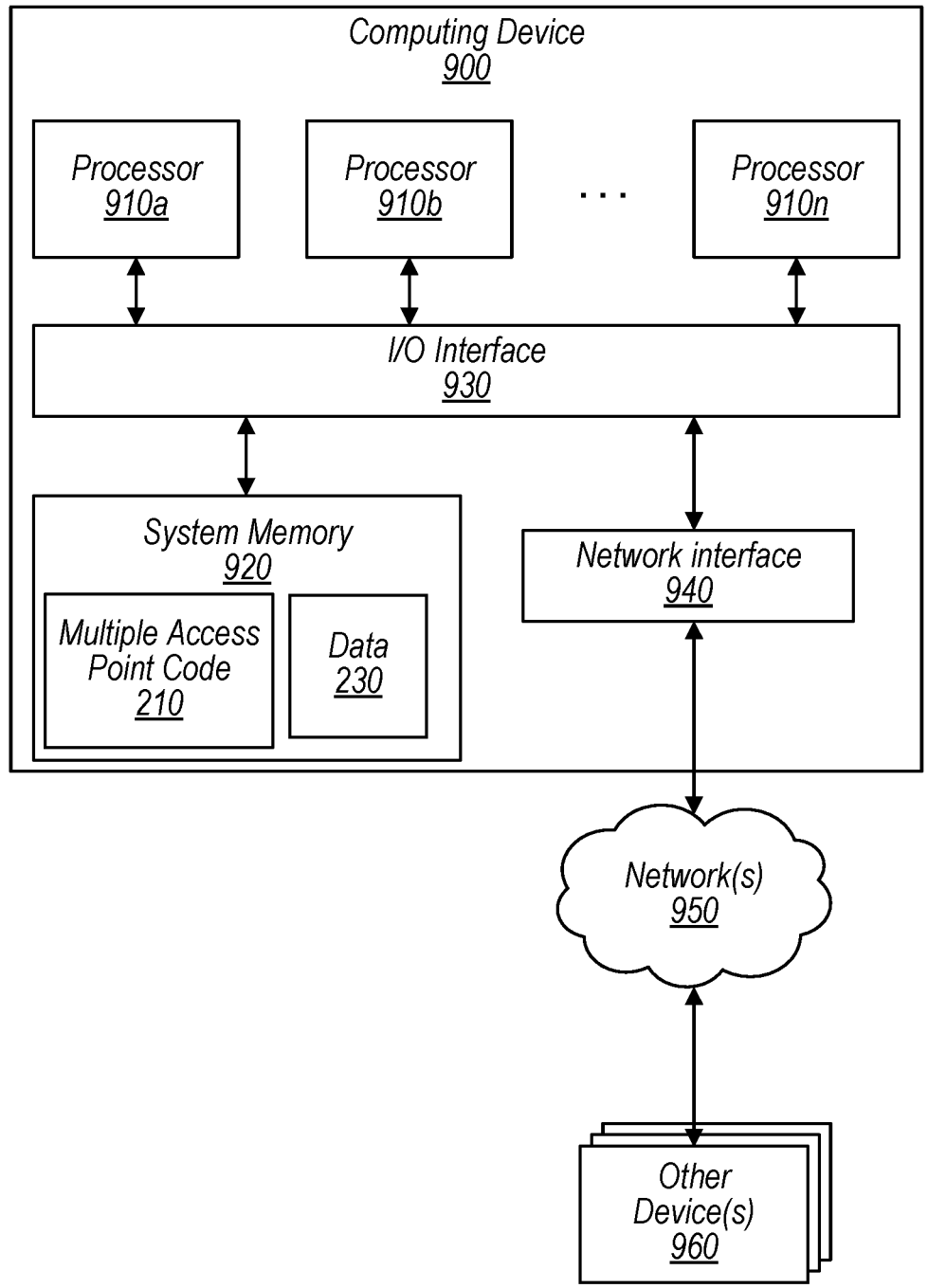
FIG. 9 illustrates an example of a computer system, one or more of which may implement various components described and illustrated throughout the disclosure, including components of a system that implements multiple access points for data containers, according to embodiments.

The figures are now described and illustrate various components, architectures and functionalities as non-exhaustive example implementations of multiple access points for data containers. For example, components illustrated in FIGS. 1, 2, 4, 5 and 7-9, arranged variously, may perform some or all of the functionality illustrated in FIGS. 3 and 6. FIG. 1 illustrates a high-level diagram of an architecture for a system that implements multiple access points for data containers, while FIGS. 2 and 5 illustrate control plane and data plane components for such a system. FIGS. 3 and 6 illustrate process charts that correspond to the control plane and data plane components, respectively, for such a system and FIG. 4 illustrates examples of types of access point policies for such a system. FIGS. 7 and 8 illustrate such a system implemented by a service provider and FIG. 9 illustrates a computing device for implementing such as system.

FIG. 1 illustrates a block diagram of an architecture for implementing multiple access points for data containers, according to some embodiments. The access point policies 120A-C (also illustrated in FIG. 4, described below) may be generated by a multiple access point manager 220 (described with regard to FIG. 2, below) and in accordance with various processes, such as the process illustrated in FIG. 3, described below).

In at least the illustrated embodiment, more than one access point (120A, 120B, 120C) are associated with a same, single data container 132n. Each access point 120A-C is illustrated with a respective access point policy 124A-C. As described herein, various actors, such as privileged users or owners, administrators, etc. may be given permission to engage with client devices and/or processes 110a-n to request generation of an access point and request that the access point be associated with a particular data container. In a system that implements multiple access points for a data container, each access point may be associated with a corresponding access point policy 124A-C. FIG. 1 illustrates that multiple access points can be associated with a container and each of the access points can have a different view of the data in the data container based on the access point through which the data is accessed.

Access points 120A-C are illustrated as associated with respective access point policies 124A-C and serve as multiple access points for data container 132n of storage system 130 that includes data containers 132a, 132b and 132n. A callout in FIG. 1 illustrates that data container policies and user-based policies may also be applied to the requests, as described below. In embodiments, data container policies are resource policies that specify permissions about who can access the resource, and user-based policies are policies that specify which resources a user can access.

The illustrated storage system 130 is intended to be construed broadly, and systems that implement multiple access points may implement the multiple access points architecture across one or more types of storage systems (e.g., object storage systems, key-value-based storage systems, database storage systems, etc.).

FIG. 2 illustrates a block diagram of a multiple access point manager, and API, for a system that implements multiple access points for data containers, according to some embodiments. Multiple access point manager 220 is illustrated as receiving access point-related requests from a permission holder/device or process 210. In at least the illustrated embodiment, the requests include control plane API operations such as requests for container access points [getContainerAccessPoint (account id, access_point_name)], requests to generate and store container access points [putContainerAccessPoint (account id, access_point_name)], requests to delete container access points [deleteContainerAccessPoint(account id, access_point_name)], requests to list all access points for a container [listContainerAccessPoints(account id)], requests to generate and store container access point policies [putContainerAccessPointPolicy(account id, access_point_name, policy)] requests to retrieve container access point policies [getContainerAccessPointPolicy(account id, access_point_name)] and requests to delete container access point policies [deleteContainerAccessPointPolicy(account id, access_point_name)] as a non-exhaustive list of example APIs.

In at least the illustrated embodiment, the multiple access point manager 220 receives the operations via the control plane API, verifies the requesting entity has permissions to perform the operations (e.g. against an identity and access management service), and performs the operations via interactions with a multiple access point data store 230.

FIG. 3 illustrates a flowchart for control plane requests in a system that implements multiple access points for data containers, according to some embodiments. The disclosed functionality may be performed by a multiple access point manager 220, in conjunction with a multiple access point data store, 230, illustrated in FIG. 2, in embodiments.

Control plane requests are received (block 302), via a control plane API, for example. A determination of the request type is made (block 304). For a data container request type, resources for a data container are provisioned (block 306). In at least the illustrated embodiment, a default access point is generated and associated with the data container (block 308) at or about the same time as when the data container is provisioned or created, for example. In embodiments, a default access point generated in concert with generation of the data container (e.g., at or about the same point in time or as part of a data container generation process). Not all systems necessarily generate default access points, in embodiments. In some embodiments, a direct data container endpoint (e.g., the identifier or name given to the data container) can be a type of access point. The process may then return to receiving the next control plane request (block 302).

For access point creation requests, access point data, metadata and/or policies are generated and stored (block 310) to a data store such as multiple access point data store 230, for example. Access point data or metadata may include configuration information such as, but not limited to default encryption configuration, encryption configuration settings for access point, default tags, etc. In embodiments, access point configuration information associated with an access point may include configurations that change the behavior of a request as it is processed. In some embodiments, an application program interface (API) specifies a create container access point API for the request to generate the access point for the data container. In embodiments, the API may further specify one or more of: a set access point policy API (e.g., for specifying permissions of the policy), an update or modify access point policy API (e.g., for updating or modifying the permissions of the access point policy), a delete container access point API, and/or a list container access points API, etc. An association between the access point and the data container is generated and stored (block 310), to a data store such as multiple access point data store 230, for example. The process may then return to receiving the next control plane request (block 302).

For access point deletion or modification requests. Access point data, metadata and/or policies are deleted or modified (block 314). In some embodiments, access point deletion may be implemented by deleting the association between the access point policy and the access point. The process may then return to receiving the next control plane request (block 302). Additional features of the control plane, beyond those in the non-exhaustive example above, are contemplated without departing from the scope of the disclosure.

FIG. 4 illustrates various types of access point policies, according to some embodiments. In embodiments, an access point may be implemented as an identifier or name (e.g., a DNS name or the like, etc.). Requests against the data container associated with the access point may include the identifier or name in the request, as part of a universal resource locator used to make API requests against the data container, for example. The system may enforce uniqueness of access point names among all identity and access management system users of an account, at the time of creation, for example.

In some embodiments, access point policies are limited in applicability to data plane requests. For example, implementation of creation of access point policies may prevent access point policies from specifying permissions or restrictions on control plane requests.

Access point 120A is illustrated as being associated with an access point policy 120A that specifies the authorized user as Bob and specifies an access type of read and write permissions. Though one or more regional-type policies, a data container may be associated with multiple access points for multiple different regions, in embodiments. For example, in a distributed system of a service provider that spans multiple geographic regions, clients (e.g., Bob) in one region may be provided with an access point that is particular to that region, while clients in another region may be provided with an access point that is particular to the other region. Both access points may provide access to the same data container, in embodiments. A regional access point name may be a tuple (region, account, name) where the region is the canonical name of the system region containing the access point, the account is the account id of the owner of the access point, and the name is a customer-provided name for the access point and, in embodiments.

Default-type access point 120B is illustrated as being associated with access policy 124B that specifies authorized users as all authorized users (e.g., all users that are authorized via a user-based policy, distinct from the default access point policy 124B) and the access type is specified as a read only permission.

Access point 120C is illustrated as being associated with access point policy 124C that specifies authorized requests as those that originate from the virtual private cloud (VPC) network specified in the VPC access point policy and the access type read/write is specified as the permission.

Other-type access point 120D is illustrated as associated with other access point policy 124D that is illustrated as being customizable with regard to authorized user granularity and access type.

Each of the access points 120A-D are illustrated as being associated with data container 132n and provide multiple points of access to the data in the data container. FIG. 4 illustrates that data container 132n is associated with a data container policy 402. In some embodiments, systems may or may not implement data container policies for data containers.

In some embodiments, an access point policy, such as access point policies 124A-124D, can also have filters associated therewith to limit the fields or records that can be viewed based on the access point being utilized. For example, if Bob is authorized to read/write only a subset of fields or records within Data Container 132n, then the system may apply a filter (specified by or otherwise associated with access point polity 124A) that filters out those fields or records that Bob does not have access to. Such a filter can be established by an owner or administrator of data container 132n, or the access point, by, identifying those fields that should be filtered out or identifying those fields that should be viewable. As such, those fields that are filtered may be perceived as not existing in data container 132n from Bob's perspective. It will also be appreciated that in some instances the policy may specify that Bob has read access privileges to some fields, but also specifies that Bob's write privileges are limited to a subset of those fields. An example implementation of such instances, could have the viewable fields identified in a similar manner to that described above with respect to the filtering, but another setting (e.g., flag or other indicator) could indicate whether an individual field is editable.

In further embodiments, an access point policy could be associated with additional functionality that is to be applied to requests processed by the access point. This could be accomplished, for instance, by linking the access point to an application or code, or a sequence of applications or code, to be executed for requests processed through the access point. An example of this would be a system that is triggered a request to execute designated code in a serverless execution environment. Such additional functionality could perform actions based on: the data being requested; the type of request (e.g., read, write, list, etc.); the request itself or aspects thereof; or any other functionality the owner/administrator wants to apply to the requests. Examples of such additional functionality include, but are not limited to, obfuscation (e.g., obfuscate PII—personally identifiable information), encryption, throttling, and summarizing (e.g., a user just has access to statistics on the dataset, but not the underlying dataset itself).

FIG. 4 illustrates an access point policy 124D with an example filter configured to obfuscate sensitive data and with an example function of summarize, for example. Various different implementations are contemplated, including but not limited to regular expression-based obfuscation, or machine-learning-model-based obfuscation. In an example obfuscation implementation, regular expressions may be used for matching text with a pattern. An associated obfuscation transformation may be applied to obfuscate regular expression literals to make them harder to understand by a human (e.g., without changing their original pattern, in embodiments). Also, the obfuscation transformation may be implemented such that the same regular expression may look different each time it is obfuscated because the transformation replaces characters randomly, making the obfuscated output look polymorphic, in embodiments.

As indicated above, throttling is an example function that may be specified by, or otherwise associated with, an access point policy. One example implementation includes a shared repository of data being accessed or processed by one or more processes (e.g., serverless functions, etc.) that access or process the data. A process may execute (e.g., a serverless function may spin up) and access a throttling counter that is associated with the shared repository to determine whether a throttling threshold has been reached. If the throttling threshold is met, processing by the process may be throttled (processing of data from the repository by the process may be reduced or prevented altogether, for example). If the throttling threshold is not met, the throttling counter may be incremented and the process may proceed with processing the data from the shared data repository, for example.

Summarization is another example function. Such a function may summarize data from the access point without enabling the end user to actually access the data itself, for example. For instance, a summarization function may apply an average to a data point to anonymize the data.

It is contemplated that various filters and functionality, such as the examples provided above, may be combined into an overall process and the process of combined filters and functions may be associated with an access point policy for a particular access point. For example, a serverless function may perform the following combined overall process: i. perform combined obfuscation and/or encryption of at least portions of the data, ii. track the number of requests, iii. throttle requests through that access point, and iv. summarize at least some of the data from the access point without enabling the end user to actually access the underlying data itself.

FIG. 5 illustrates a flowchart for data plane requests in a system that implements multiple access points for data containers, according to some embodiments. In the illustrated embodiment, client devices/processes 110a-n generate requests that are sent to storage service 130. The requests may be of various types, including, but not limited to, data access requests, performance of some functionality (e.g., data transforms, encryption, etc.). The storage service processes (described in FIG. 6, described below) the requests based on access-point-related data stored in a multiple access point data stores(s) 220a-n. The multiple access point data store 220 may be implemented by any of various types of data stores, including, but not limited to, a serializable transaction log that is transactionally-consistent, for example. The requests may be to read, write, or modify data in data containers 132a-n, for example. Responses to the requests may be provided back to the client devices/processes 110a-n, in embodiments.

FIG. 6 illustrates a flowchart for data plane requests in a system that implements multiple access points for data containers, according to some embodiments. In some embodiments, the illustrated techniques may be performed by one or more components of a storage service (e.g., by a front end of a storage service or the like) and the technique may include processing more than one layer of policies.

A request to perform an operation (e.g., data access, performance of some functionality such as a data transform or the like) associated with a data container is received that includes an access point identifier (block 602). In embodiments, multiple different access points are associated with any given data container and the system uses the identifier in the request to determine which access point (and perhaps which policy) to associate the request with. An access point policy associated with the data container is determined, based on the access point identifier (block 604). In embodiments, the identifier in the requests are used by the system to determine configuration and policy information. The access point policy is applied (block 606). For example, one or more permissions or restrictions or rules specified in the policy are applied to determine whether to deny or grant the request. Configuration information, distinct from the policy information, may also be applied. If the determination is to deny the request, the request is denied (block 608). A message associated with the denial may be returned to the requesting entity and the process continues to receive the next request (block 602), etc. If the determination is to grant the request based on application of the access point policy (block 606, grant) the process may move on to apply another policy, for example, a container policy is applied (block 610). If application of the container policy results in a determination to deny the request, the request is denied (block 608). A message associated with the denial may be returned to the requesting entity and the process continues to receive the next request (block 602), etc. If application of the container policy results in a determination to grant the request, the requested operation (e.g., data access, performance of an operation, etc.) is performed according to the one or more policies (block 612). For example, access may be limited by a permission type (e.g., read only) or geography, or limited to access from a VPC, in embodiments.

FIG. 7 illustrates a service provider network that provides control plane and data plane interfaces for a system that implements multiple access points for data containers, according to embodiments. Various combinations of components in FIG. 7 may perform at least some of the functionality illustrated in FIGS. 3 and 6.

FIG. 7 illustrates that control plane interface 708 (e.g., a control plane API) provides access for permission holder device/process 210 to transmit control plane-level requests to multiple access point manager 102. In some embodiments, the control plane interface and/or the multiple access point manager 102 may be implemented as separate from a data store or may be integrated into a front-end API of a data store.

In at least the illustrated embodiment, multiple access manager 102 may have access (e.g., via a network) to an identity and access management (IAM) service 706 for processing user-based policies associated with users making requests via the control plane API. The multiple access point manager 102 may apply the user-based policies to the requests to determine whether to grant the control-plane level requests. For example, only owners or administrators or certain privileged processes may be granted permission(s) to make control plane level requests. Also illustrated is a master multiple access point data store 220 that stores various types of data associated with access points (e.g., access point identifiers, policies, associations, etc., although one or of the types of data may be stored in other data stores, together or apart from the other data types).

In at least the illustrated embodiment, data and/or metadata associated with access points may be replicated across multiple replicas to scale for large request volumes, for example. FIG. 7 also illustrates access point data store replicas 704a-n.

Client device(s)/process(es) 110a-n are illustrated as having access to storage service 130 via data plane interface 710 (e.g., a data plane API). The storage service 130 may implement the data plane interface 710 in some embodiments. Storage service 130 is illustrated as having access (e.g., via a network) to an identity and access management (IAM) service 706 for processing user-based policies associated with users making requests via the data plane API. The storage service may apply the user-based policies to the requests to determine whether to grant the data-plane level requests. For example, various granularities of users and/or processes, etc. may be granted permission(s) to make data plane level requests (via specification in the access point policies, for example).

Storage service 130 is illustrated with key map 712 and data containers 132a-n. In some embodiments, access point metadata (e.g., access point policies) may be stored in keymap 712 (e.g., along with container policies, in some embodiments). The storage service may apply a user-based policy and/or an access point policy to determine whether to perform the request with regard to the data containers in storage service 130, in embodiments.

FIG. 8 illustrates a block diagram of a service provider that implements a fleet of compute instances that implement a compute service 802, a portion of which serves as a virtual private cloud (VPC) for an owner, as well as a storage system 130 that implements multiple access points for data containers, according to some embodiments. FIG. 8 illustrates a VPC endpoint 820 of a virtual private cloud that acts as a path to a particular data container of data containers 132*a-n* of storage system 130. In some embodiments a VPC endpoint attaches additional metadata (e.g., metadata such as an identifier or network address of the VPC) to traffic such as the request. When the storage system 130 receives a request that identifies a particular access point (e.g., access point 120C), it checks the access policy associated with the access point (in this case a VPC access point policy) and denies or grants the request based on whether the request was received via the VPC path specified in the VPC access point policy. In embodiments the storage system checks the access point policy associated with the access point (in this case a VPC access point policy) and denies or grants the request based on whether the request originated from within a VPC specified in the VPC access point policy, using the metadata attached to the request by the VPC endpoint, for example.

In embodiments, a regional access point policy may operate similar to the virtual private cloud access point policy, albeit within the context of a regional computing system, instead of within the context of a virtual private cloud. That is, a regional access point policy may specify permissions at the granularity of a region of a computer system (e.g., a geographical region of a large service provider system) instead of at the granularity of a virtual private cloud.

It is contemplated that in at least some embodiments, an access point may be associated with more than one data container. For example, a single access point may be associated with multiple regional copies of a definitive data container and requests made to the single access point may be routed to one of the regional copies. The system may be configured to provide various amounts of synchronization among copies, in embodiments.

In some systems that use a data container identifier or name to access a data container, it may be difficult to delete the container identifier or name without forever losing access to the container. In some embodiments herein, data containers and access points are decoupled such that all access points associated with a data container may deleted while the system still retains an identifier or name for the data container (i.e., while no access points for the data container may exist, the data container itself remains addressable). At least one benefit of such an architecture is the ability to more easily reinstate lost access to data containers.

Example Computer System

FIG. 9 illustrates an example of a computer system, one or more of which may implement various components described and illustrated throughout the disclosure, including one or more components that implement multiple access points for data containers, according to embodiments.

Various portions of systems in FIGS. 1, 2, 4, 5, and 7-9 and/or methods presented in FIGS. 3 and 6 described herein, may be executed on one or more computer systems similar to that described herein, which may interact with various other devices of the system.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 960, such as cursor control device, keyboard, audio device, and display(s). In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for multiple access points for data containers may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 920 may be configured to store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a multiple access points for data containers system and method, are shown stored within system memory 920 as multiple access points for data containers code 210 and data 220, respectively. In other embodiments, program instructions and/or data may be received, sent, or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940. Program instructions may include instructions for implementing the techniques described with respect to any of the FIGS.

In some embodiments, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 900 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions (e.g., such as code 210), configured to implement embodiments of multiple access points for data containers systems and methods as described herein, and data storage 220, comprising various data accessible by the program instructions 210. In one embodiment, program instructions 210 may include software elements of a method illustrated in the above figures. Data storage 220 may include data that may be used in embodiments described herein. In other embodiments, other or different software elements and/or data may be included.

Those skilled in the art will appreciate that computer system 900 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., multiple access points for data containers) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing nodes comprising one or more processors and memory storing program instructions that implement:
a data storage service configured to:
receive a first request directed to an access point address for accessing a data container; and
fulfill the first request based on a first access point policy associated with the access point address for the data container; and
an access point manager configured to:
receive, via an API, a request to determine a second access point policy for the access point address for the data container; and
determine, based on the request, the second access point policy;
wherein the data storage service is configured to:
receive a second request directed to the access point address for the data container; and
fulfill the second request based on the second access point policy associated with the access point address for the data container.

2. The system of claim 1, wherein the access point manager is configured to:
receive, via the API, one or more requests to retrieve one or more of the access point policies; and
provide, responsive the one or more requests, the requested one or more access point policies.

3. The system of claim 1, wherein the access point manager is configured to:
receive, via the API, one or more requests to delete one or more of the access point policies; and
delete, responsive the request, the one or more access point policies requested for deletion.

4. The system of claim 1, wherein the access point manager is configured to receive, via the API:
set access point policy requests for specifying permissions of an access point policy; and
modify access point policy requests for modifying the permissions of an access point policy.

5. The system of claim 1, wherein one or more permissions specified by one or more of the access point policies comprise specification of one or more filters to be applied to data from the data container.

6. The system of claim 1, wherein one or more permissions specified by one or more of the access point policies comprise policy permissions that limit access to one or more particular types of access, comprising read-only access or access only from a virtual private cloud.

7. The system of claim 1, wherein the access point manager is configured to determine, for each of the requests and based on the respective access policy address, the respective first and second point policy that serves as basis to fulfill the respective requests.

8. A computer-implemented method, comprising:
receiving, by a data storage service, a first access request directed to a data container;
determining, by the data storage service based on application of a first access point policy for an access point address for the data container to the access request, whether to grant the access request;
receiving, via an API of an access point manager, a request to determine a second access point policy for the access point address for the data container;
determining, responsive to a request, the second access point policy; and
storing the second access point policy for the access point address;
receiving, by the data storage service, a second request directed to the data container; and
fulfilling the second request based on the second access point policy associated with the access point address for the data container.

9. The computer-implemented method of claim 8, further comprising:
receiving, via the API, one or more requests to retrieve one or more of the access point policies; and
providing, responsive the one or more requests, the requested one or more access point policies.

10. The computer-implemented method of claim 8, further comprising deleting one or more of the access point policies responsive to a request, received via the API, to delete one or more of the access point policies.

11. The computer-implemented method of claim 8, further comprising:
storing one or more permissions of an access point policy responsive to a set access point policy request, received via the API, specifying the one or more permissions for the access point policy; or
modifying one or more permissions of an access point policy responsive to a modify access point policy request, received via the API, specifying the one or more modifications for the access point policy.

12. The computer-implemented method of claim 8, wherein the second access point policy is determined based on one or more access point policy templates that are customizable and reusable.

13. The computer-implemented method of claim 8, wherein one or more permissions specified by one or more of the access point policies comprise policy permissions that limit access to one or more particular types of access, comprising read-only access or access only from a virtual private cloud.

14. The computer-implemented method of claim 8, further comprising determining, for each of the requests and based on the respective access policy address, the respective first and second access point policy that serves as basis for fulfilling the respective requests.

15. One or more non-transitory computer-readable media comprising program instructions executable on or across one or more processors to perform:
determining, responsive to receipt of a first access request directed to a data container and based on application of a first access point policy for an access point address for the data container to the access request, whether to grant the access request;
determining, in response to receipt via an API of a request to determine a second access point policy for the access point address for the data container, the second access point policy;
instructing storage of the second access point policy for the access point address; and
fulfilling, responsive to receiving a second request directed to the data container, the second request based on the second access point policy associated with the access point address for the data container.

16. The one or more non-transitory computer-readable media of claim 15, storing program instructions executable to perform:
receiving, via the API, one or more requests to retrieve one or more of the access point policies; and
providing, responsive the one or more requests, the requested one or more access point policies.

17. The one or more non-transitory computer-readable media of claim 15, storing program instructions executable to perform deleting the container access point policy responsive to a request, received via the API, to delete the container access point policy.

18. The one or more non-transitory computer-readable media of claim 15, storing programs executable to perform:
- storing one or more permissions of an access point policy responsive to a set access point policy request, received via the API, specifying the one or more permissions for the access point policy; or
- modifying one or more permissions of an access point policy responsive to a modify access point policy request, received via the API, specifying the one or more modifications for the access point policy.

19. The one or more non-transitory computer-readable media of claim 15, wherein:
- one or more permissions specified by one or more of the access point policies comprise policy permissions that limit access to one or more particular types of access, comprising read-only access or access only from a virtual private cloud; and
- the program instructions are executable to enforce the policy permissions that limit access to one or more particular types of access.

20. The one or more non-transitory computer-readable media of claim 15, storing programs executable to perform determining, for each of the requests and based on the respective access policy address, the respective first and second access point policy that serves as basis for fulfilling the respective requests.

* * * * *